(12) United States Patent
Sugai et al.

(10) Patent No.: US 8,339,495 B2
(45) Date of Patent: Dec. 25, 2012

(54) SOLID-STATE IMAGE PICKUP APPARATUS AND METHOD FOR DRIVING SOLID-STATE IMAGE PICKUP APPARATUS

(75) Inventors: Takashi Sugai, Ebina (JP); Yuichiro Yamashita, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 12/040,046

(22) Filed: Feb. 29, 2008

(65) Prior Publication Data
US 2008/0246867 A1 Oct. 9, 2008

(30) Foreign Application Priority Data
Apr. 9, 2007 (JP) ................................. 2007-101668

(51) Int. Cl.
*H04N 3/14* (2006.01)
*H04N 5/335* (2011.01)
(52) U.S. Cl. ....................................... 348/308; 348/302
(58) Field of Classification Search ........... 348/302–310
See application file for complete search history.

(56) References Cited

U.S. PATENT DOCUMENTS
7,570,293 B2 8/2009 Nakamura
7,920,196 B2 4/2011 Nakamura
2005/0174452 A1* 8/2005 Blerkom et al. ............... 348/294
2006/0050162 A1* 3/2006 Nakamura ..................... 348/308
2006/0250519 A1* 11/2006 Kawakami ..................... 348/371
2007/0024731 A1* 2/2007 Muramatsu et al. .......... 348/308
2007/0139544 A1* 6/2007 Egawa et al. .................. 348/308

FOREIGN PATENT DOCUMENTS
JP 5-48460 A 2/1993
JP 2005-348324 A 12/2005
JP 2006-080861 A 3/2006

OTHER PUBLICATIONS
Japanese Office Action dated Jan. 31, 2012, in related Japanese Patent Application No. 2007-101668.

* cited by examiner

*Primary Examiner* — Sinh Tran
*Assistant Examiner* — Christopher K Peterson
(74) *Attorney, Agent, or Firm* — Fitzpatrick, Cella, Harper & Scinto

(57) ABSTRACT

A solid-state image pickup apparatus includes rows and columns of pixels, each column or each set of a plurality of columns being provided with an analog-to-digital converter. When an operation for holding analog electric signals performed by the analog-to-digital converters is performed simultaneously with an operation for outputting data from memories holding digital signals that are output from the analog-to-digital converters, "streaky noise" artifacts appear on an image obtained by such operations. To avoid this, the operation for holding the analog electric signals and the operation for outputting data from the memories holding the digital signals are set apart from each other by at least one data clock period of a scanning circuit.

19 Claims, 8 Drawing Sheets

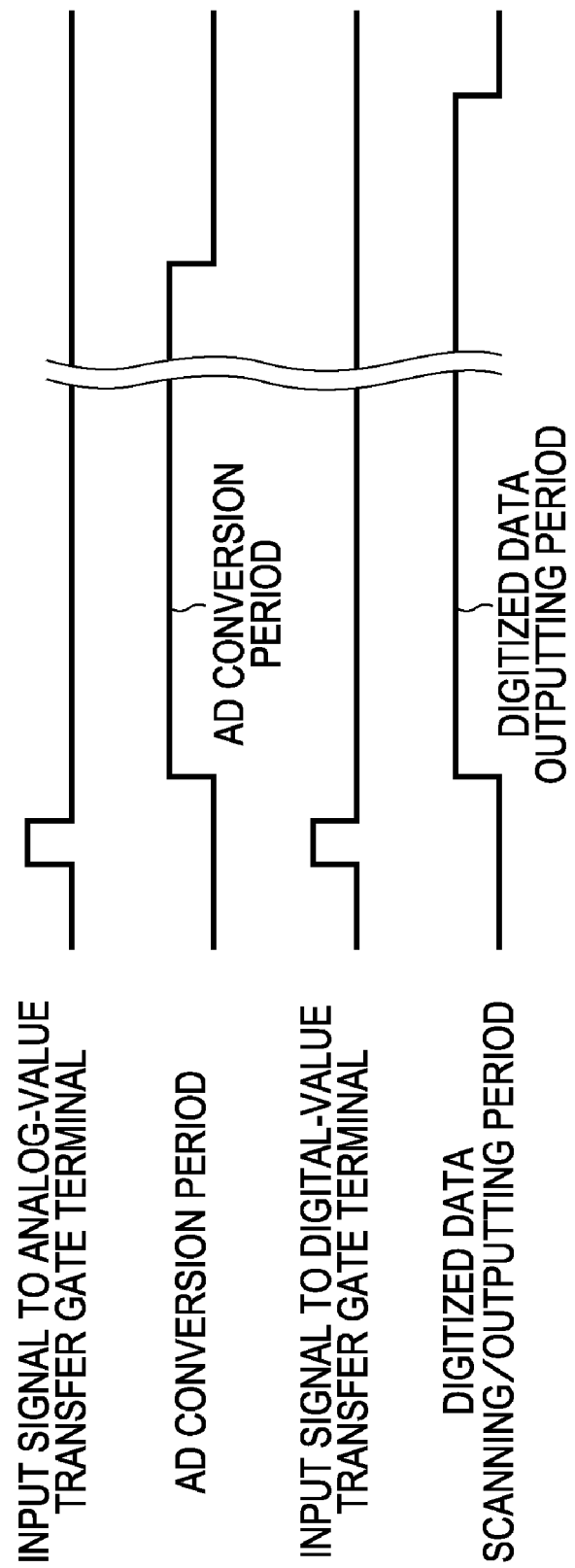

SOLID-STATE IMAGE PICKUP APPARATUS AND METHOD FOR DRIVING SOLID-STATE IMAGE PICKUP APPARATUS

BACKGROUND OF THE INVENTION

1. Field of the Invention

The present invention relates to solid-state image pickup apparatuses. More particularly, the present invention relates to solid-state image pickup apparatuses that include rows and columns of pixels in which, for each column, an analog-to-digital (AD) converter and a digital memory are provided.

2. Description of the Related Art

In response to a recent demand for faster operation of solid-state image pickup devices, complementary metal-oxide semiconductor (CMOS) image sensors have been developed, in which an AD converter is provided for each column of pixels so that analog signals are converted into digital signals for the column, thereby realizing faster operation.

Japanese Patent Laid-Open No. 5-048460 discloses a CMOS image sensor that includes an AD converter for each column of pixels. The sensor is driven in such a manner that AD conversion for each column and output of digital signals to horizontal output lines overlap on the time axis, thereby realizing faster operation. FIGS. 7 and 8 show a schematic circuit diagram of the solid-state image pickup apparatus disclosed in Japanese Patent Laid-Open No. 5-048460 and a timing chart of the same, respectively.

AD converters called cyclic AD converters have also been developed. A cyclic AD converter performs AD conversion by repeating the following: conversion of an input analog signal into a digital signal, calculation of the difference between the input analog signal and a reference voltage to produce a difference signal, application of an appropriate gain to the difference signal, and reinput of the difference signal to a comparator. After the difference signal reinput to the comparator is compared, the difference signal is temporarily held in an internal analog memory included in the cyclic AD converter. Herein, the difference signal held in the internal analog memory is referred to as an internal analog signal.

With respect to a conventional apparatus that includes such AD converters, referring to FIG. 8, an operation for holding analog electric signals and an operation for outputting digital signals from memories holding the digital signals are performed simultaneously. The inventors have found that, in such operations, "streaky noise" artifacts appear in an obtained image. Such streaky noise becomes more apparent particularly when the AD converters have a high resolution and when the output digital signals are amplified. Further, because an image area corresponding to a column with noise is generally brighter or darker than those corresponding to columns without noise, such noise is more recognizable than noise that would occur randomly on an image plane. Human eyes have a tendency to recognize streaky noise more than random noise. Because of such tendency, streaky noise has larger influence on image quality, and should be suppressed.

SUMMARY OF THE INVENTION

The present invention provides a solid-state image pickup apparatus that includes rows and columns of pixels, in which each column or each set of a plurality of columns is provided with an analog-to-digital (AD) converter and a digital memory, which are advantageously used to obtain an image with higher quality than what is obtained with a conventional apparatus.

In a first aspect of the present invention, a solid-state image pickup apparatus includes the following: a plurality of pixels configured to convert incident light into analog electric signals and to output the analog electric signals, the plurality of pixels being arranged in rows and columns; a plurality of analog-to-digital converters configured to convert the analog electric signals from the plurality of pixels into digital signals and to output the digital signals, each of the plurality of analog-to-digital converters being respectively provided for a column or a set of a plurality of columns of the plurality of pixels, and each of the plurality of analog-to-digital converters including an analog memory configured to hold an analog electric signal; a plurality of first digital memories configured to hold the digital signals converted by the plurality of analog-to-digital converters; a plurality of second digital memories configured to hold the digital signals that are held in and output from the plurality of first digital memories; and a scanning circuit configured to control a timing for outputting the digital signals from the plurality of second digital memories. A timing for outputting the digital signals held in the plurality of first digital memories or the plurality of second digital memories and a timing for holding the analog electric signals in the analog memories are set apart from each other by at least one data clock period of the scanning circuit.

In a second aspect of the present invention, a solid-state image pickup apparatus includes the following: a plurality of pixels configured to convert incident light into analog electric signals and to output the analog electric signals, the plurality of pixels being arranged in rows and columns; a plurality of cyclic analog-to-digital converters configured to convert the analog electric signals from the plurality of pixels into digital signals and to output the digital signals, each of the plurality of cyclic analog-to-digital converters being respectively provided for a column or a set of a plurality of columns of the plurality of pixels; a plurality of first digital memories configured to hold the digital signals converted by the plurality of cyclic analog-to-digital converters; a plurality of second digital memories configured to hold the digital signals that are held in and output from the plurality of first digital memories; and a scanning circuit configured to control a timing for outputting the digital signals from the plurality of second digital memories. Each of the cyclic analog-to-digital converters includes an internal analog memory configured to hold an internal analog signal generated in the cyclic analog-to-digital converter when converting an analog electric signal into a digital signal. A timing for outputting the digital signals held in the plurality of first digital memories or the plurality of second digital memories and a timing for holding the internal analog signals in the internal analog memories are set apart from each other by at least one data clock period of the scanning circuit.

The first and second aspects of the present invention provide a solid-state image pickup apparatus in which AD conversion and output of digital data are performed in an overlapping manner on the time axis. In such an apparatus, the level or amount of streaky noise occurring in an image based on the output signals and appearing parallel to scanning lines can be reduced, whereby an image with higher quality can be obtained than what can be obtained conventionally.

Further features of the present invention will become apparent from the following description of exemplary embodiments considered with reference to the attached drawings.

BRIEF DESCRIPTION OF THE DRAWINGS

FIG. 8 is an exemplary timing chart showing the timing in a driving operation performed by the solid-state image pickup apparatus shown in FIG. 7.

DESCRIPTION OF THE EMBODIMENTS

First Embodiment

A first embodiment of the present invention described below concerns a solid-state image pickup apparatus in which a transfer of data to second digital memories is driven in a level-triggered operation. This apparatus is intended to suppress the occurrence of noise in transferring data from first digital memories to the second digital memories.

Figure 1:
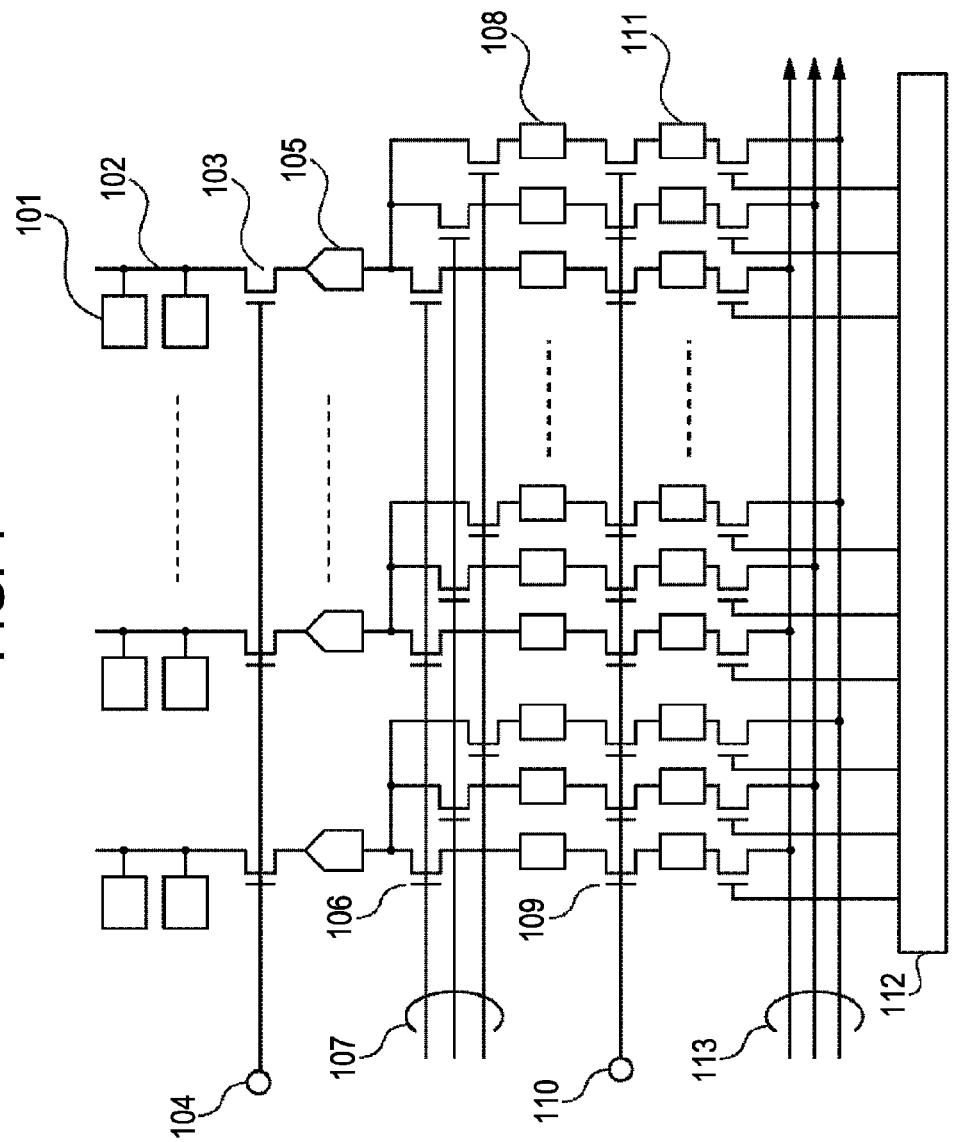
FIG. 1 is an exemplary block diagram of a solid-state image pickup apparatus according to a first embodiment of the present invention.

FIG. 1 is a block diagram showing the configuration of the solid-state image pickup apparatus according to the first embodiment of the invention. Pixels 101, which are arranged in rows and columns, each include a photoelectric conversion element that converts incident light into an analog electric signal. The pixels 101 included in each column are mutually connected by a column output line 102. Analog electric signals output from the pixels 101 to the column output lines 102 are transferred to AD converters 105 when corresponding column-signal transfer switches 103 are switched on. Each of the AD converters 105 includes an analog memory (not shown) for holding an analog electric signal. The first embodiment concerns an exemplary case of 3-bit AD converters. However, the invention is not limited thereto. The AD converters 105 may be generalized as n-bit AD converters. The analog electric signals are converted by the AD converters 105 into digital signals. The digital signals are transferred to first digital memories 108 via corresponding first transfer switches 106 driven by signals that are input from first transfer-switch-driving terminals 107. Because the first embodiment describes an exemplary case of 3-bit AD converters, the output from each AD converter 105 is transferred to three corresponding first digital memories 108. The digital signals held in the first digital memories 108 are transferred to corresponding second digital memories 111 via second transfer switches 109 driven by a signal that is input from a second transfer-switch-driving terminal 110. A digital signal held in one of the second digital memories 111 connected to one of switches selected by a horizontal shift register circuit 112 is output to a corresponding signal output line 113. The horizontal shift register circuit 112 is a scanning circuit that controls the timing for outputting signals from the second digital memories 111 to the signal output lines 113. If the AD converters 105 have an n-bit resolution, the solid-state image pickup apparatus includes n first digital memories 108 and n second digital memories 111 for each AD converter 105.

Figure 2:
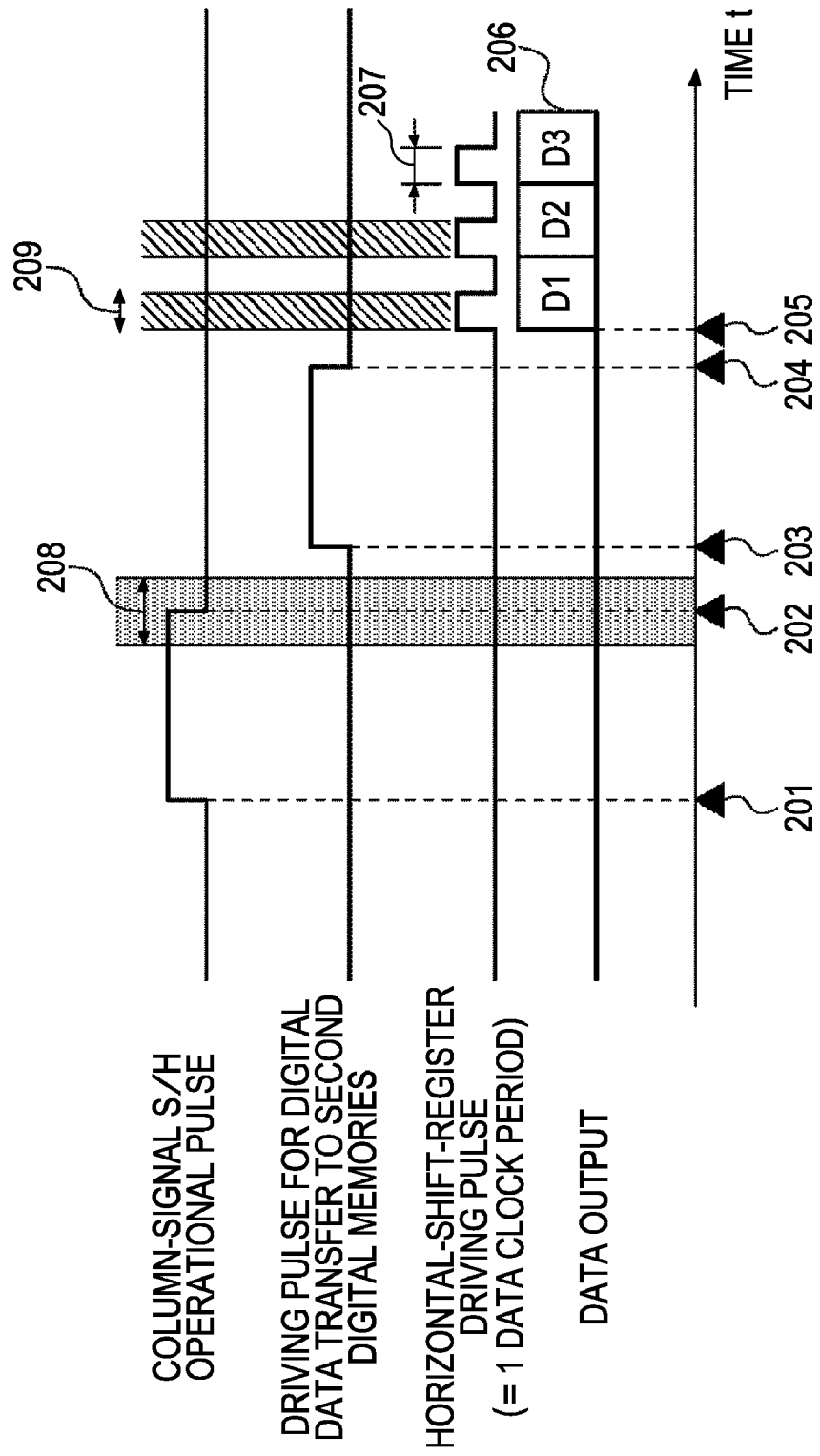
FIG. 2 is an exemplary timing chart showing the timing in a driving operation performed by the solid-state image pickup apparatus shown in FIG. 1.

FIG. 2 is a timing chart showing the timing in a driving operation performed by the solid-state image pickup apparatus shown in FIG. 1.

Focusing on an operation of a certain row, prior to time 201, incident light is converted by the pixels 101 into analog electric signals, which are subsequently output to the column output lines 102. At the time 201, a column-signal sampling/holding (S/H) operational pulse that is input to an S/H driving terminal 104 rises to a high level, whereby the analog electric signals that have been output to the column output lines 102 are sampled by the analog memories. At time 202, the column-signal S/H operational pulse falls to a low level, whereby the column-signal transfer switches 103 are switched off and the analog electric signals are held in the analog memories. The held analog electric signals are converted into digital signals. The results of this conversion are transferred to the first digital memories 108.

At time 203, a driving pulse that is input to the second transfer-switch-driving terminal 110 for transferring the digital data to the second digital memories 111 rises to the high level, whereby transfer of the digital signals held in the first digital memories 108 to the second digital memories 111 begins. At time 204, the transfer is completed. At time 205, a horizontal-shift-register driving pulse is input from the horizontal shift register circuit 112, whereby the signals held in the second digital memories 111 of each column are sequentially output to the signal output lines 113 via the switches switched on in response to the driving pulse.

As mentioned above, the inventors have found that a streaky noise parallel to the scanning lines appears in images produced according to the conventional art, in which an operation for holding analog electric signals and an operation for transferring data from first digital memories to second digital memories are performed simultaneously. In the first embodiment, however, the period for completing the transfer of digital data from the first digital memories 108 to the second digital memories 111 is set apart from the timing for holding the analog electric signals in the analog memories of the AD converters 105 by at least one data clock period represented by the horizontal-shift-register driving pulse. Further, the time 204 when the data transfer from the first digital memories 108 to the second digital memories 111 is completed may precede the time 202 by at least one data clock period. That is, referring to FIG. 2, it is only necessary that the period denoted by reference numeral 208 does not overlap the period from the time 203 to the time 204 with a time interval of at least one data clock period therebetween.

The inventors have also found that simultaneous performance of an operation for holding analog electric signals and an operation for outputting signals from the second digital memories to the signal output lines may cause the above-mentioned streaky noise to appear in an obtained image. In the first embodiment, however, the period denoted by reference numeral 209 during which the operation for outputting signals from the second digital memories 111 is performed is set apart from the timing for holding the analog electric signals in the analog memories of the AD converters 105 by at least one data clock period represented by the horizontal-shift-register driving pulse.

In an experiment in which a solid-state image pickup apparatus of the first embodiment was applied, the level of streaky noise was reduced to about one fifth of that in a conventional apparatus. Particularly in the case where the output data was read after being amplified by a digital signal processing circuit or where the output data was corrected in a digital domain, image quality was greatly improved.

It is assumed that noise occurs because of changes in current or voltage caused by the transfer of signals from the first digital memories 108 to the second digital memories 111, including changes in the internal capacitance of a sensor chip, the inductance of wiring, and the voltage of a substrate or the like on which the sensor chip is mounted. It is also assumed that the degree of noise reduction depends on factors such as the number and size of pixels included in the solid-state image pickup apparatus. Further, in the case where each AD converter includes a single-end operational amplifier, the same advantage as described above was produced.

The reason why the signal transfer from the first digital memories 108 to the second digital memories 111 is performed before or after the time 202 when holding of the analog electric signals is performed with a time interval of at least one data clock period therebetween will now be described.

The data clock period is a clock period represented by a pulse for driving a horizontal shift register so as to output data from the memories, and is determined by the possible speed of driving the horizontal shift register. The data clock period is a parameter dependent on the manufacturing process, and is dependent on the time required for the internal wiring, whose current or voltage has changed, to recover its steady state current or voltage. Therefore, if the data transfer from the AD converters to the digital memories is completed at least one data clock period before the column signals are held by the AD converters, the internal wiring has sufficient time to relax from a noisy state to the steady state. Accordingly, the column signals can be read correctly. Even if the timing of the S/H operational pulse for sampling/holding the analog electric signals is delayed, the delay will be one data clock period at most. Therefore, when data transfer from the AD converters to the digital memories is set to be delayed by one data clock period from the pulse transition for holding the analog electric signals in the AD converters, an image to be obtained is not influenced by noise.

The first embodiment concerns an exemplary case where a single AD converter is provided for each column of pixels. If a single AD converter is provided for each set of a plurality of columns of pixels, the same advantage is also obtained while the area occupied by the apparatus is reduced.

Second Embodiment

A second embodiment according to the present invention will now be described. The second embodiment concerns a solid-state image pickup apparatus whose second digital memories are delay (D) flip-flops that perform edge-triggered data transfer, and is intended to suppress noise occurring in data transfer from the first digital memories to the second digital memories.

Figure 3:
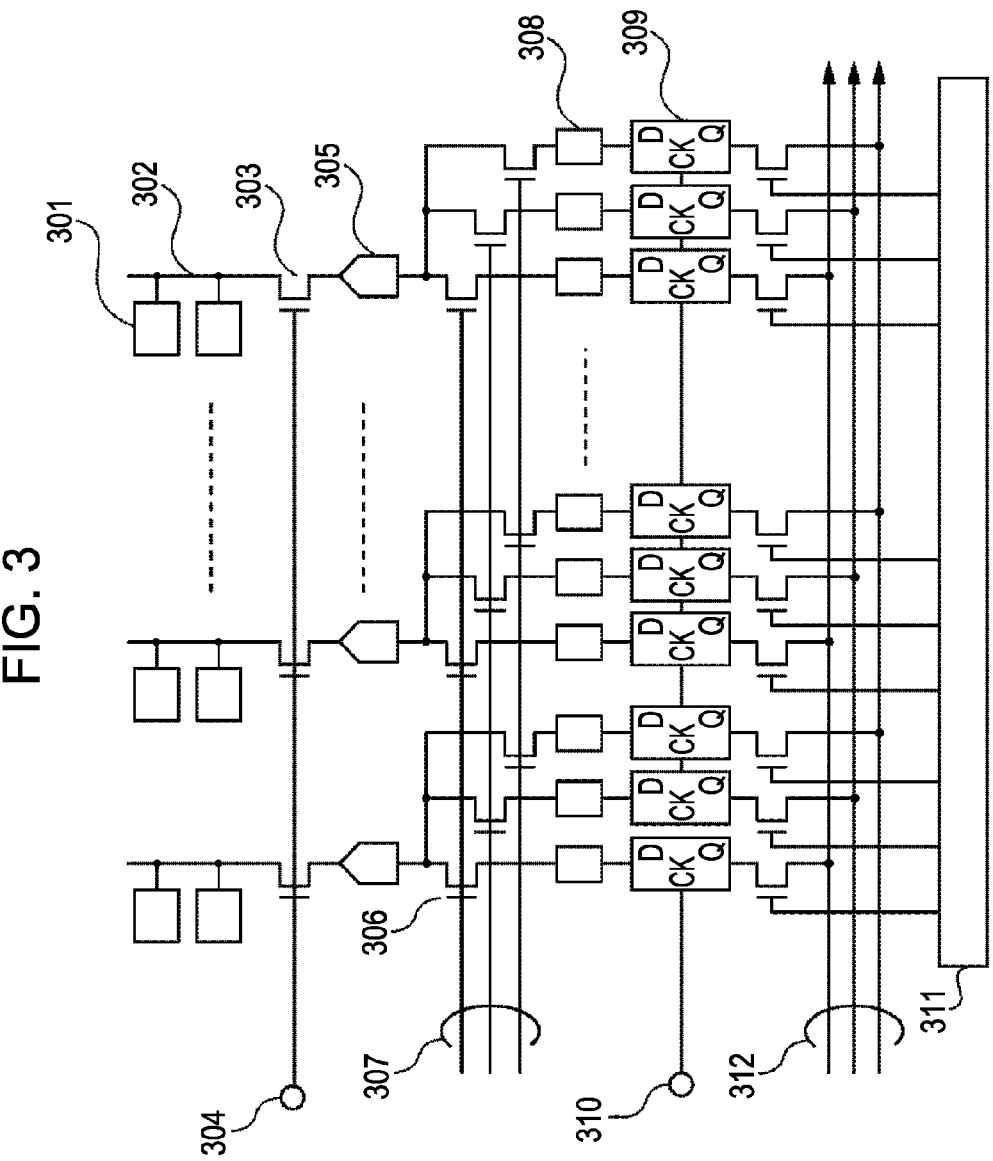
FIG. 3 is an exemplary block diagram of a solid-state image pickup apparatus according to a second embodiment of the present invention.

FIG. 3 is a block diagram of a solid-state image pickup apparatus according to the second embodiment. This apparatus differs from the apparatus shown in FIG. 1 in that it includes D flip-flops functioning as the second digital memories, such that the second transfer switches included between the first digital memories and the second digital memories in the apparatus shown in FIG. 1 are omitted. AD converters 305 are 3-bit AD converters, as in the first embodiment. However, the present invention is not limited thereto. The AD converters 305 may be generalized as n-bit AD converters.

Figure 4:
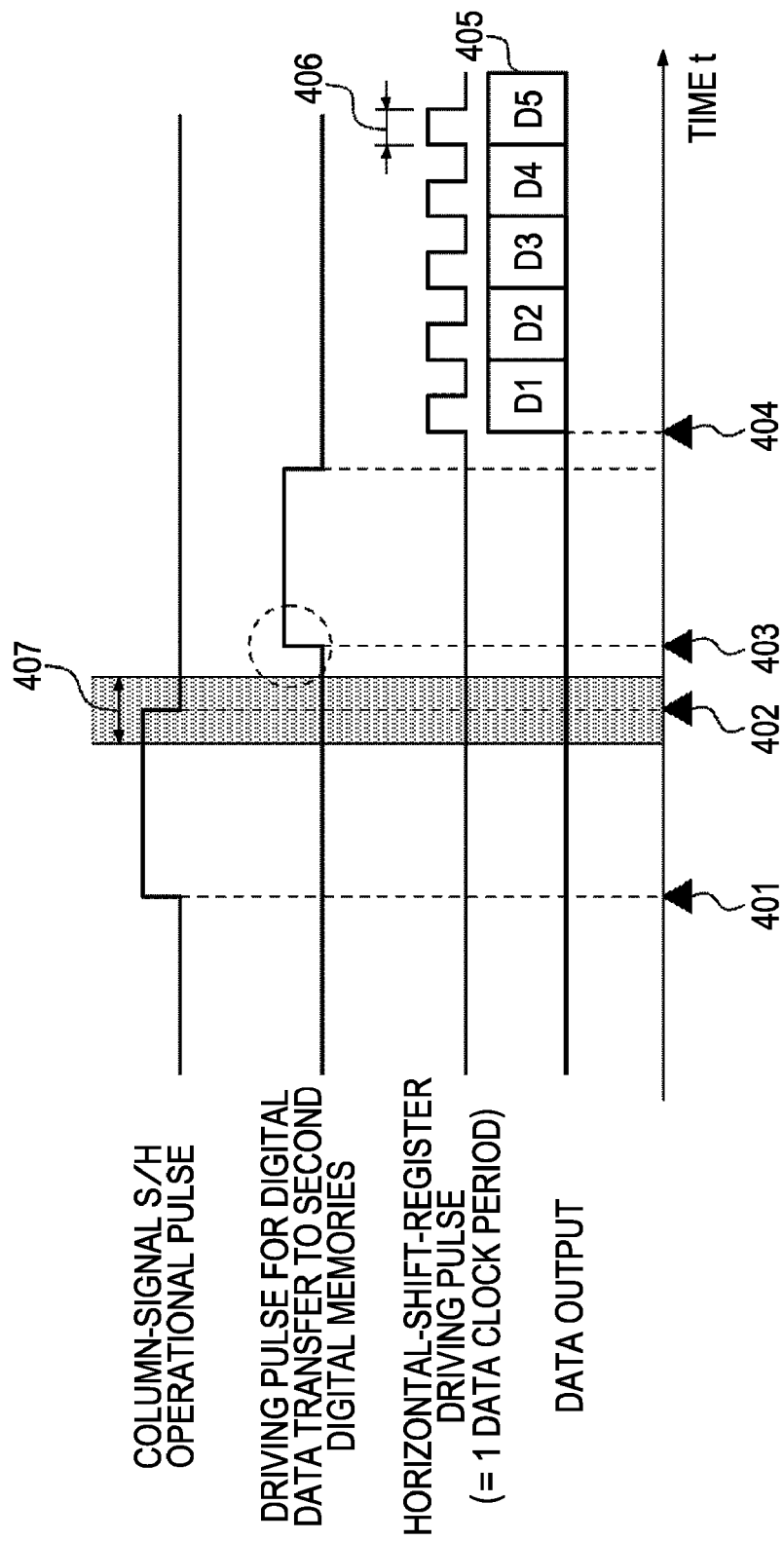
FIG. 4 is an exemplary timing chart showing the timing in a driving operation performed by the solid-state image pickup apparatus shown in FIG. 3.

FIG. 4 is a timing chart showing the timing in a driving operation performed by the solid-state image pickup apparatus shown in FIG. 3.

Focusing on an operation of a certain row, prior to time 401, incident light is converted by pixels 301 into analog electric signals, which are subsequently output to column output lines 302. At the time 401, a column-signal S/H operational pulse that is input to an S/H driving terminal 304 rises to a high level, whereby the analog electric signals that have been output to the column output lines 302 are sampled by analog memories. At time 402, the column-signal S/H operational pulse falls to a low level, whereby column-signal transfer switches 303 are switched off and the analog electric signals are held in the analog memories. The held analog electric signals are converted into digital signals, and then the digital signals are transferred to first digital memories 308.

At time 403, a driving pulse that is input to D flip-flops 309 and drives transfer of the digital data to the second digital memories rises to a high level, whereby the digital signals held in the first digital memories 308 are transferred to the D flip-flops 309 functioning as the second digital memories. In the second embodiment, the D flip-flops 309 perform edge-triggered data transfer and are used as the second digital memories. Therefore, upon the rise of the pulse at the time 403, the D flip-flops 309 hold the digital signals. At time 404, a horizontal-shift-register driving pulse is input from a horizontal shift register circuit 312, whereby the signals held in the D flip-flops 309 of each column are sequentially output to signal output lines via switches switched on in response to the driving pulse. If the AD converters 305 have an n-bit resolution, the solid-state image pickup apparatus includes n first digital memories and n second digital memories for each AD converter 305.

The inventors have found that the above-mentioned streaky noise appears in the conventional art in which an operation for holding analog electric signals and an operation for transferring data from first digital memories to second digital memories are performed simultaneously. In the second embodiment, however, the period for transferring digital data from the first digital memories to the second digital memories is set apart from the timing for holding the analog electric signals in the analog memories of the AD converters 305 by at least one data clock period represented by the horizontal-shift-register driving pulse.

Because the second embodiment includes D flip-flops that perform an edge-triggered operation, it is only necessary that the time 403 for starting data transfer from the first digital memories to the second digital memories be set apart from the time 402 for holding the analog electric signals by at least one data clock period of the horizontal shift register. That is, it is only necessary that the operation performed at the time 403, which follows the time 402 in FIG. 4, not be performed during a period denoted by reference numeral 407, i.e., the period from one data clock period before until one data clock period after the time 402. Further, with the use of D flip-flops, only the time 403 for starting data transfer from the first digital memories to the second digital memories needs to be focused on. Therefore, flexibility in setting the timing of an operation increases. Furthermore, the use of D flip-flops eliminates the need to provide switches between the first digital memories and the second digital memories, which are the D flip-flops, thereby contributing to size reduction of the solid-state image pickup apparatus.

In an experiment in which a solid-state image pickup apparatus of the second embodiment was applied, the level of streaky noise was reduced to about one fifth of that in a conventional apparatus. Particularly in the case where the output data was read after being amplified by a digital signal processing circuit or where the output data was corrected in a digital domain, image quality was greatly improved.

It is assumed that noise occurs because of changes in current or voltage caused by data transfer from the first digital memories to the second digital memories, including changes in the internal capacitance of a sensor chip, the inductance of wiring, the voltage of a substrate or the like on which the sensor chip is mounted. It is also assumed that the degree of noise reduction depends on factors such as the number and size of pixels included in the solid-state image pickup apparatus. Further, in the case where each AD converter includes a single-end operational amplifier, the same advantage as described above was produced.

The second embodiment concerns an exemplary case where a single AD converter is provided for each column of pixels. If a single AD converter is provided for each set of a plurality of columns of pixels, i.e., each two columns, for example, the same advantage is also obtained while the area occupied by the apparatus is reduced.

Third Embodiment

A third embodiment according to the present invention will now be described. The third embodiment concerns a solid-state image pickup apparatus that includes D flip-flops as the second digital memories and cyclic AD converters as the AD converters.

Figure 5:
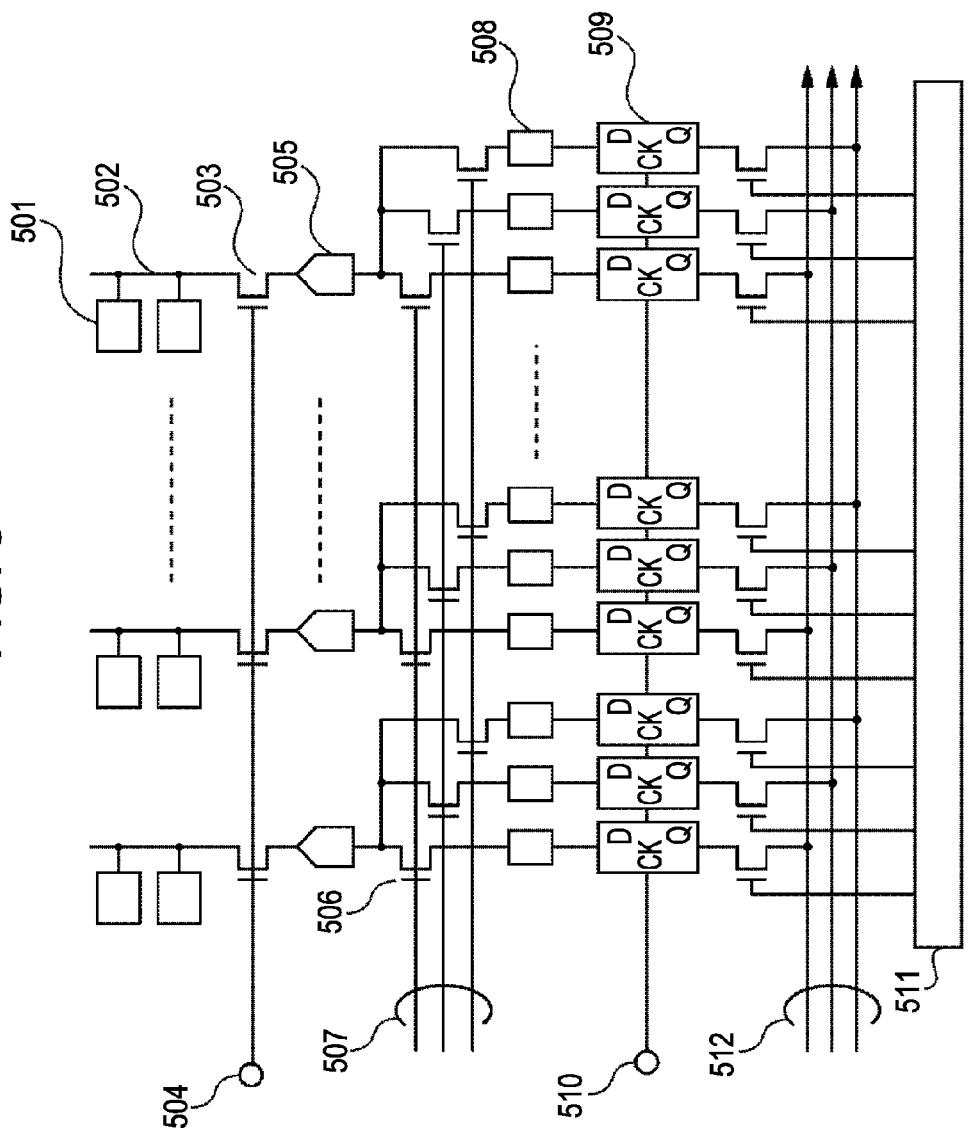
FIG. 5 is an exemplary block diagram of a solid-state image pickup apparatus according to a third embodiment of the present invention.

FIG. 5 is a block diagram of a solid-state image pickup apparatus according to the third embodiment. This apparatus differs from the apparatus shown in FIG. 3 in that it includes cyclic AD converters 505 instead of the AD converters 305. The cyclic AD converters 505 are 3-bit AD converters. However, the present invention is not limited thereto. The cyclic AD converters 505 may be generalized as n-bit cyclic AD converters.

Figure 6:
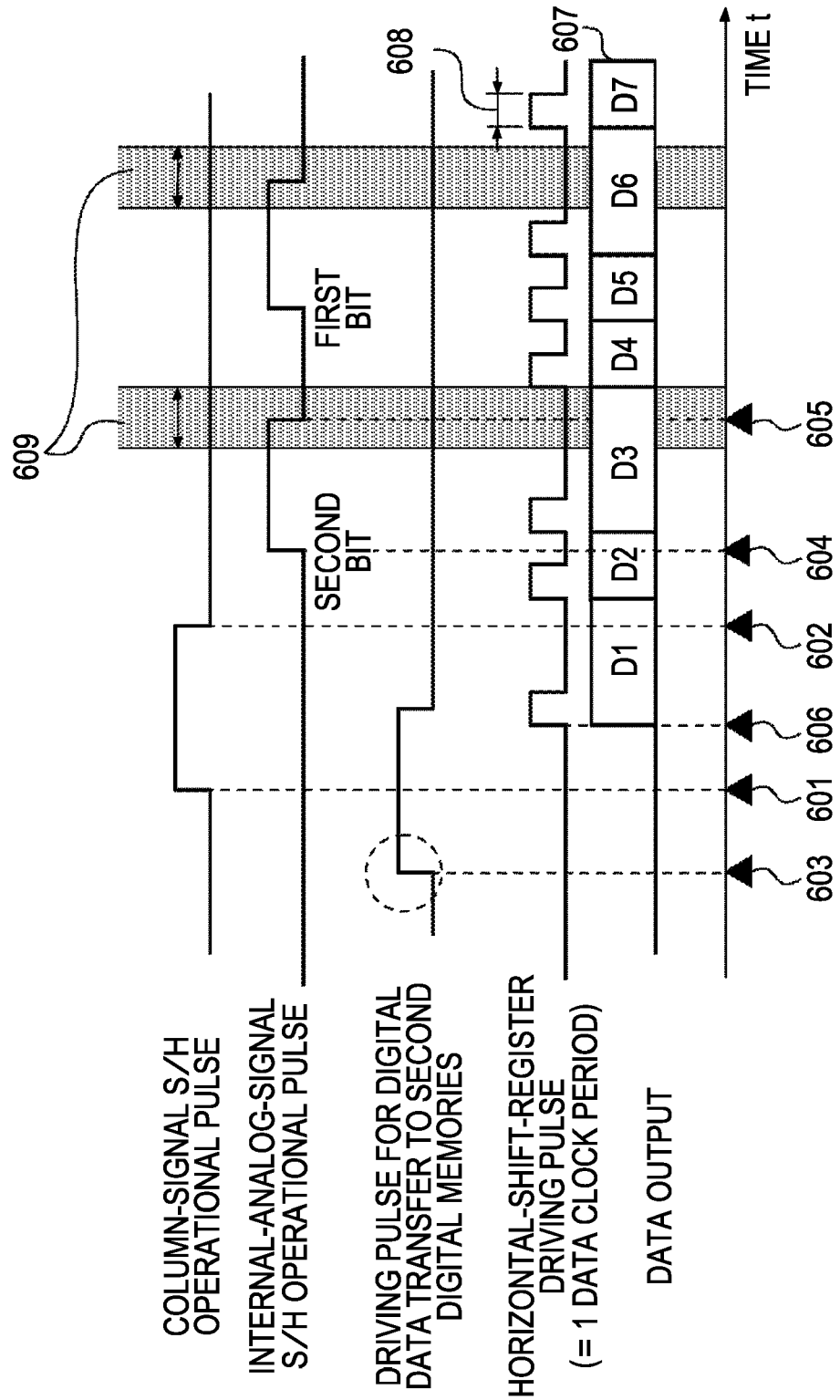
FIG. 6 is an exemplary timing chart showing the timing in a driving operation performed by the solid-state image pickup apparatus shown in FIG. 5.
Figure 7:
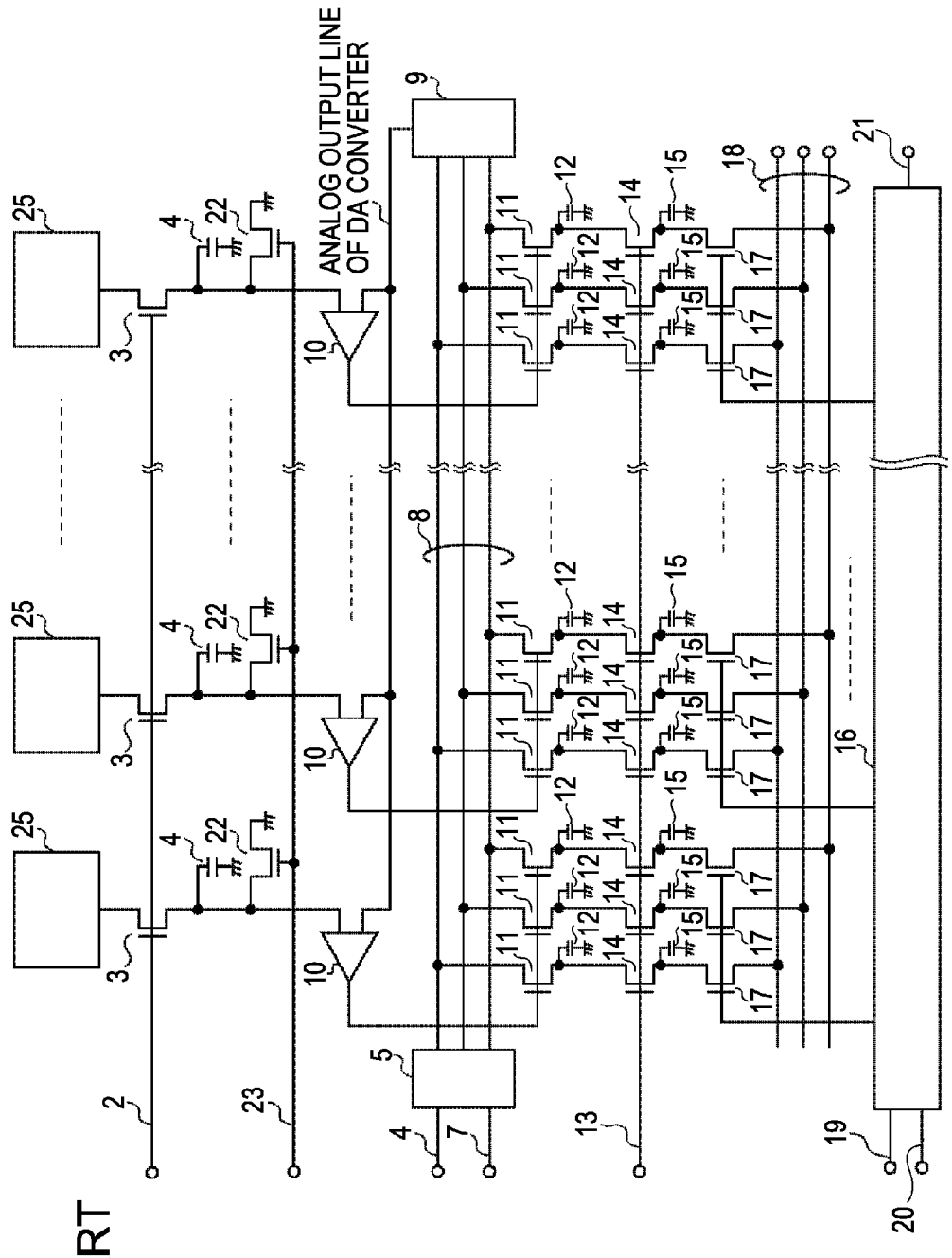
FIG. 7 is an exemplary block diagram of a conventional solid-state image pickup apparatus.

FIG. 6 is a timing chart showing the timing in a driving operation performed by the solid-state image pickup apparatus shown in FIG. 5, which includes the cyclic AD converters 505.

At time 603, a driving pulse for transferring digital data to the second digital memories rises to a high level, whereby digital signals based on pixels in the (n−1)-th row are transferred from the first digital memories to the second digital memories. Because the second digital memories in the third embodiment are D flip-flops 509, data is transferred upon the rise of the pulse to the high level.

Then, at time 601, analog electric signals from pixels in the n-th row start to be sampled. During the period from time 602 to time 604, which is a period for holding the analog electric signals, the analog electric signals from the n-th row are checked for the third bit. The checked analog electric signals are subjected to an appropriate processing, sampled by internal analog memories of the AD converters 505 at the time 604 as internal analog signals for the second bit, and held therein at time 605. Then, the second-bit internal analog signals held in the internal analog memories are compared with a reference voltage. The results of the comparison are output and then subjected to an appropriate processing to become internal analog signals for the first bit. The first-bit internal analog signals are subjected to the same processing as that used for the second-bit internal analog signals. If the AD converters 505 have an n-bit resolution, the solid-state image pickup apparatus includes n first digital memories and n second digital memories for each AD converter 505.

The inventors have found that the above-mentioned streaky noise appears in an image obtained if an operation for holding internal analog signals and an operation for transferring data from first digital memories to second digital memories are performed simultaneously. In the third embodiment, however, the timing for transferring data from the first digital memories to the second digital memories is set apart from both the timing for holding the analog electric signals and the timing for holding the internal analog signals, by at least one data clock period of the horizontal shift register circuit.

In an experiment in which a solid-state image pickup apparatus of the third embodiment was applied, the level of streaky noise was reduced to about one fifth of that in a conventional apparatus. Particularly in the case where the output data was read after being amplified by a digital signal processing circuit or where the output data was corrected in a digital domain, image quality was greatly improved.

If one of the timing for holding the analog electric signals and the timing for holding the internal analog signals is set apart from the timing for transferring data from the first digital memories to the second digital memories by at least one data clock period of the horizontal shift register circuit, image quality is improved. The third embodiment concerns an exemplary case where both of the holding timings are set apart from the timing for transferring data from the first digital memories to the second digital memories by at least one data clock period. Therefore, image quality is more improved than in the conventional case.

The inventors have also found that the above-mentioned streaky noise appears in an obtained image if one of the timing for holding the analog electric signals and the timing for holding the internal analog signals overlaps the timing for transferring data from second digital memories to signal output lines. In the third embodiment, however, the timing for transferring data from the second digital memories to the signal output lines is set apart from both the timing for holding the analog electric signals and the timing for holding the internal analog signals, by at least one data clock period of the horizontal shift register circuit.

It is assumed that noise occurs because of changes in current or voltage caused by the transfer of data from the first digital memories to the second digital memories and by the outputting of data from the second digital memories to the signal output lines. For example, such changes are seen in the internal capacitance of a sensor chip, the inductance of wiring, and the voltage of a substrate or the like on which the sensor chip is mounted. It is also assumed that the degree of noise reduction depends on factors such as the number and size of pixels included in the solid-state image pickup apparatus. Further, in the case where each AD converter includes a single-end operational amplifier, the same advantage as described above was produced.

Further, in the third embodiment, because D flip-flops functioning as the second digital memories enable an edge-triggered operation, only the timing for starting data transfer from the first digital memories to the second digital memories needs to be focused on. Accordingly, flexibility in setting the timing of an operation increases.

Even in the case where the transfer of data from the first digital memories to the second digital memories was driven on the basis of the level-triggered operation, the same advantage was produced by setting the period for data transfer apart from the timing for holding the internal analog signals by at least one data clock period of the horizontal shift register circuit.

The third embodiment concerns an exemplary case where a single AD converter is provided for each column of pixels. If a single AD converter is provided for each set of a plurality of columns of pixels, i.e., each two columns, for example, the same advantage can also be produced while the area occupied by the apparatus is reduced.

If one of the timing for holding the analog electric signals and the timing for holding the internal analog signals is set apart from the timing for transferring data from the second digital memories to the signal output lines by at least one data clock period of the horizontal shift register circuit, image quality is improved. The third embodiment concerns an exemplary case where both of the holding timings are set apart from the timing for transferring data from the second digital memories to the signal output lines by at least one data clock period. Therefore, image quality is more improved than in the conventional case.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-101668 filed Apr. 9, 2007, which is hereby incorporated by reference herein in its entirety.

What is claimed is:

1. A solid-state image pickup apparatus comprising:
a plurality of pixels configured to convert incident light into analog electric signals and to output the analog electric signals, the plurality of pixels being arranged in rows and columns;
a plurality of analog-to-digital converters configured to convert the analog electric signals from the plurality of pixels into digital signals and to output the digital signals, each of the plurality of analog-to-digital converters being respectively provided for a different column of the plurality of pixels, and each of the plurality of analog-to-digital converters including an analog memory configured to hold an analog electric signal;
a plurality of first digital memories configured to hold the digital signals converted by the plurality of analog-to-digital converters;
a plurality of second digital memories configured to hold the digital signals that are held in and output from the plurality of first digital memories; and
a scanning circuit configured to control a timing for outputting the digital signals from the plurality of second digital memories,
wherein the solid-state image pickup apparatus is configured to sequentially convert the analog electric signals into digital signals for the plurality of rows of pixels; and
wherein a timing for outputting the digital signals derived from a row of the pixels held in the plurality of first digital memories, and a timing for holding the analog electric signals derived from a subsequent row of the pixels in the analog memories are different from each other by at least one data clock period of the scanning circuit.

2. The solid-state image pickup apparatus according to claim 1, wherein at least one of: the plurality of first digital memories and the plurality of second digital memories is a plurality of delay flip-flops.

3. The solid-state image pickup apparatus according to claim 1, wherein each analog-to-digital converter includes a single-end operational amplifier.

4. The solid-state image pickup apparatus according to claim 1, further comprising a digital signal processing circuit configured to amplify and output the digital signals that are output from the plurality of second digital memories.

5. The solid-state image pickup apparatus according to claim 4, wherein the digital signal processing circuit is configured to perform a correction.

6. The solid-state image pickup apparatus according to claim 1,
wherein each analog-to-digital converter has an n-bit resolution, and
wherein n first digital memories and n second digital memories are provided for each analog-to-digital converter.

7. The solid-state image pickup apparatus according to claim 1, wherein an analog-to-digital conversion performed by the plurality of analog-to-digital converters and an operation for outputting the digital signals from the plurality of second digital memories overlap on a time axis.

8. The solid-state image pickup apparatus according to claim 1, wherein the analog electric signals held by the analog memories derive from a first row of the rows, and the digital signals held in the plurality of first digital memories derive from a second row of the rows, the second row being selected prior to selection of the first row.

9. A solid-state image pickup apparatus comprising:
a plurality of pixels configured to convert incident light into analog electric signals and to output the analog electric signals, the plurality of pixels being arranged in rows and columns;
a plurality of analog-to-digital converters configured to convert the analog electric signals from the plurality of pixels into digital signals and to output the digital signals, each of the plurality of analog-to-digital converters being respectively provided for a different column of the plurality of pixels, and each of the plurality of analog-to-digital converters including an analog memory configured to hold an analog electric signal;
a plurality of first digital memories configured to hold the digital signals converted by the plurality of analog-to-digital converters;
a plurality of second digital memories configured to hold the digital signals that are held in and output from the plurality of first digital memories; and
a scanning circuit configured to control a timing for outputting the digital signals from the plurality of second digital memories,
wherein the solid-state image pickup apparatus is configured to sequentially convert the analog electric signals into digital signals for the plurality of rows of pixels; and
wherein a timing for outputting the digital signals derived from a row of the pixels held in the plurality of second digital memories and a timing for holding the analog electric signals derived from a subsequent row of the pixels in the analog memories are different from each other by at least one data clock period of the scanning circuit.

10. The solid-state image pickup apparatus according to claim 9, wherein the analog electric signals held by the analog memories derive from a first row of the rows, and the digital signals held in the plurality of second digital memories derive from a second row of the rows, the second row being selected prior to selection of the first row.

11. The solid-state image pickup apparatus according to claim 9, wherein a timing for outputting the digital signals derived from a row of the pixels held in the plurality of first digital memories and a timing for holding the analog electric signals derived from a subsequent row of the pixels in the analog memories are set apart from each other by at least one data clock period of the scanning circuit.

12. A solid-state image pickup apparatus comprising:
a plurality of pixels configured to convert incident light into analog electric signals and to output the analog electric signals, the plurality of pixels being arranged in rows and columns;

a plurality of analog-to-digital converters configured to convert the analog electric signals from the plurality of pixels into digital signals and to output the digital signals, each of the plurality of analog-to-digital converters being respectively provided for a different column of the plurality of pixels, and each of the plurality of analog-to-digital converters including an analog memory configured to hold an analog electric signal;

a plurality of first digital memories configured to hold the digital signals converted by the plurality of analog-to-digital converters; and a plurality of second digital memories configured to hold the digital signals that are held in and output from the plurality of first digital memories, wherein the solid-state image pickup apparatus is configured to sequentially convert the analog electric signals into digital signals for the plurality of rows of pixels, and wherein a timing for outputting the digital signals derived from a row of the pixels held in the plurality of digital memories and a timing for holding the analog electric signals derived from a subsequent row of the pixels in the analog memories are different from each other.

13. A solid-state image pickup apparatus comprising:

a plurality of pixels configured to convert incident light into analog electric signals and to output the analog electric signals, the plurality of pixels being arranged in rows and columns;

a plurality of cyclic analog-to-digital converters configured to convert the analog electric signals from the plurality of pixels into digital signals and to output the digital signals, each of the plurality of cyclic analog-to-digital converters being respectively provided for a column or a set of a plurality of columns of the plurality of pixels;

a plurality of first digital memories configured to hold the digital signals converted by the plurality of cyclic analog-to-digital converters;

a plurality of second digital memories configured to hold the digital signals that are held in and output from the plurality of first digital memories; and a scanning circuit configured to control a timing for outputting the digital signals from the plurality of second digital memories, wherein each of the cyclic analog-to-digital converters includes an internal analog memory configured to hold an internal analog signal generated in the cyclic analog-to-digital converter when converting an analog electric signal into a digital signal, wherein the solid-state image pickup apparatus is configured to sequentially convert the analog electric signals into digital signals for the plurality of rows of pixels, and wherein a timing for outputting the digital signals derived from a row of the pixels held in the plurality of first digital memories or the plurality of second digital memories and a timing for holding the internal analog signals derived from a subsequent row of the pixels in the internal analog memories are different from each other by at least one data clock period of the scanning circuit.

14. The solid-state image pickup apparatus according to claim 13, wherein at least one of the plurality of first digital memories and the plurality of second digital memories is a plurality of delay flip-flops.

15. The solid-state image pickup apparatus according to claim 13, wherein each cyclic analog-to-digital converter includes a single-end operational amplifier.

16. The solid-state image pickup apparatus according to claim 13, further comprising a digital signal processing circuit configured to amplify and output the digital signals that are output from the plurality of second digital memories.

17. The solid-state image pickup apparatus according to claim 16, wherein the digital signal processing circuit is configured to perform a correction.

18. The solid-state image pickup apparatus according to claim 13, wherein each cyclic analog-to-digital converter has an n-bit resolution, and wherein n first digital memories and n second digital memories are provided for each analog-to-digital converter.

19. The solid-state image pickup apparatus according to claim 13, wherein an analog-to-digital conversion performed by the plurality of cyclic analog-to-digital converters and an operation for outputting the digital signals from the plurality of second digital memories overlap on a time axis.

* * * * *